E. S. HUTTON.
MEANS FOR CONTROLLING DISCHARGE FROM GLASS TANKS.
APPLICATION FILED NOV. 10, 1919.
1,423,220.
Patented July 18, 1922.
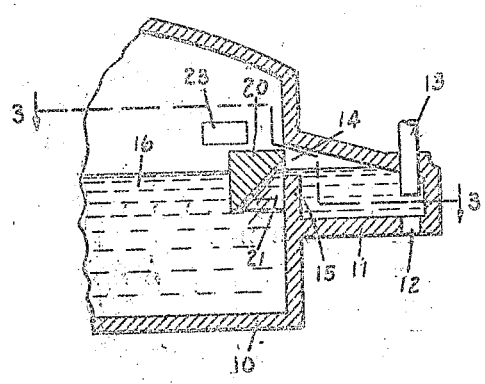
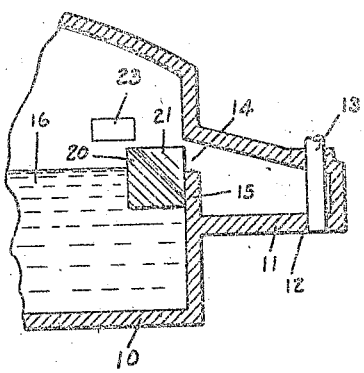
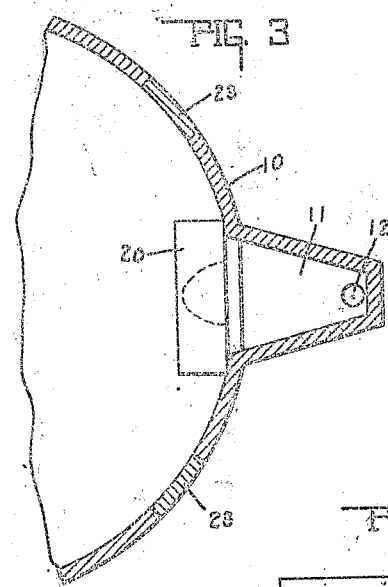
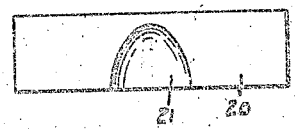
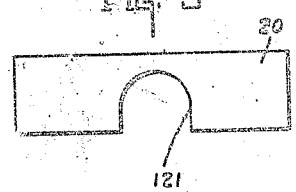
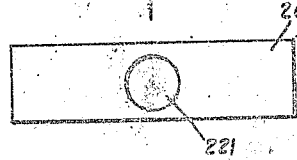
INVENTOR:
EDWARD S. HUTTON.
BY
ATTORNEYS.

UNITED STATES PATENT OFFICE.

EDWARD S. HUTTON, OF LAPEL, INDIANA.

MEANS FOR CONTROLLING DISCHARGE FROM GLASS TANKS.

1,423,220. Specification of Letters Patent. Patented July 18, 1922.

Application filed November 10, 1919. Serial No. 336,835.

*To all whom it may concern:*

Be it known that I, EDWARD S. HUTTON, a citizen of the United States, and a resident of Lapel, county of Madison, and State of Indiana, have invented a certain new and useful Means for Controlling Discharge from Glass Tanks; and I do hereby declare that the following is a full, clear, and exact description thereof, reference being had to the accompanying drawings, in which like numerals refer to like parts.

The object of this invention is to provide a satisfactory means for shutting off the flow of glass from a glass tank in a glass factory to the spout or discharge chamber thereof, when the tank is not being used or operated temporarily during Sundays or any temporary shutdown, and thereby prevent the glass chilling in the discharge spout or outlet and requiring the removal of the chilled glass.

Heretofore it has been customary on the occasion of such temporary shutdowns to close the outlet opening in the discharge spout with a clay plug or the like or with a sand plug or an asbestos plug. After the glass is chilled around any of these plugs and it is desired to resume operation, the operator finds that it requires a good deal of time to remove the chilled glass from around the plugs or from the outlet opening if it had become filled with chilled glass, and to get the glass flowing again. This invention is to overcome the foregoing trouble.

The chief feature of the invention consists in providing a floater block inside of the glass tank adapted to extend across the outlet to the spout and close the flow of glass thereto, when the block is in one position, but permits the flow of glass thereto when the block is in another position. The operator determines the position of the block. With this arrangement the channel in the discharge spout will be entirely drained and said channel and the outlet opening therefrom will be free from chilled glass. Therefore, on the resumption of operation, all that is necessary is to adjust the floater block and the fresh hot glass immediately flows into the discharge spout and out of it through the discharge outlet.

The full nature of the invention will be understood from the accompanying drawings and the following description and claim:

In the drawings Fig. 1 is a vertical section through a portion of a glass tank and the discharge spout with the floater block in position to permit the flow of the glass from the tank to the spout, during the operation of the machine. Fig. 2 is the same as Fig. 1 with the floater block adjusted to prevent any discharge of glass from the tank to the spout. Fig. 3 is a horizontal section on the line 3—3 of Fig. 1. Fig. 4 is a front elevation of the form of floater blocks shown in Figs. 1, 2 and 3. Figs. 5 and 6 show modified forms of floater blocks.

There is shown in the drawings herein a glass tank 10 and a discharge spout 11 having a discharge outlet 12 adapted to be closed by a plug 13 operated by any desired means. It has the usual horizontal opening 14 from the glass tank to the discharge spout, which is over the portion 15 of the wall which lies between the glass tank and discharge spout and over the top of which the glass 16 flows during the use of the glass tank.

Heretofore, when the tank was shut down for any period, the flow of glass was stopped by the plug 13 closing the outlet opening 12 from the spout. Therefore, the spout would during the shutdown of the tank be filled with glass and the portion in the outlet opening 12 and around the plug 13 would become chilled and that would cause trouble on the resumption of operation.

With this improvement the plug 13 is used only for a very brief closure of the discharge opening 12, and for shutdowns over Sunday or for any other relatively long period, the flow of glass is stopped between the tank 10 and the discharge spout 11. This is accomplished by a floating block 20. It may be made of clay or any suitable material which will float, and preferably is rectangular in cross section and the length of it is somewhat greater than the length of the opening 14 from the tank to the discharge spout, so that it will overlap said opening, as shown in Fig. 3. The floater when made of clay is more than half submerged, as shown in Fig. 1. A groove 21 is made transversely of the plug about midway between its ends. In the form shown in the first four figures that groove is across one corner, that is, in an oblique position. Therefore, when the block is in the position shown in Fig. 1 with the groove 21 across the lower front corner of the block, the glass will rise in and discharge through said groove into the discharge spout. But if the block 20 be turned over into the position shown in Fig. 2, the groove 21 will not be across the lower front corner. It is obvious that the flow of glass from the tank to the discharge spout will be cut off and all the glass in the discharge will drain therefrom and leave it free and clear and there will be no glass left to chill and close the outlet opening 12 and give trouble in its removal.

The floating block 20 can be turned or adjusted in position by removing one of the bricks 23 in the side of the tank and inserting a rod and turning over the floating block from one of the positions shown in Figs. 1 and 2, to the other position shown therein.

Fig. 5 shows a modified form of floating block having a transverse groove 121 entirely across its under side when the block is in position to permit the flow of glass from the tank to the discharge spout. When the block shown in Fig. 5 is turned over, it will prevent the flow of glass the same as in Fig. 2. Another modified form is shown in Fig. 6 where the block 20 has a transverse opening 221 through it. This block will operate in the same way as the other blocks. In all forms of these blocks the grooves or openings therethrough, when the block is in one position, extend above the top of the wall 15 to permit the flow of glass from the tank to the discharge spout.

It is thus seen that the flow of glass from the tank to the discharge spout can by means of a floating block be controlled, and when the glass is not flowing it permits the discharge spout to be clear of glass, and upon the resumption of operation, as soon as the block is turned over, the glass will freely flow into and out of the discharge spout at once. The invention is not limited to the particular material or form of the floating block or the shape of the groove or opening therethrough for the passage of glass so long as the block is such as to stop the flow of glass when in one position and permit the flow of glass when in another position.

The invention claimed is:

The combination of a glass tank, and a discharge spout, with a wall between the lower part of the spout and the glass tank and an opening above said wall for the flow of glass from the tank to the spout, a floating block inside the glass tank with a transversely disposed passageway in said block arranged so that when the block is in one position against said wall, the passageway will extend from the lower part of said block to a point higher than said wall and permit the flow of glass from the tank to the spout, and when the block is turned over will prevent such flow of glass.

In witness whereof, I have hereunto affixed my signature.

EDWARD S. HUTTON.